United States Patent
McTamaney

(10) Patent No.: US 6,580,978 B1
(45) Date of Patent: Jun. 17, 2003

(54) PATH FOLLOWING USING BOUNDED BEACON-AIDED INERTIAL NAVIGATION

(75) Inventor: Louis S. McTamaney, Los Gatos, CA (US)

(73) Assignee: United Defense, LP, Arlington, VA (US)

( * ) Notice: Subject to any disclaimer, the term of this patent is extended or adjusted under 35 U.S.C. 154(b) by 0 days.

(21) Appl. No.: 10/123,762

(22) Filed: Apr. 15, 2002

(51) Int. Cl.$^7$ .............................. G01C 21/00; G01S 1/00
(52) U.S. Cl. ..................... 701/23; 701/207; 342/357.14; 342/385
(58) Field of Search .......................... 701/23, 24, 200, 701/206, 207, 220; 342/69, 357.14, 385, 386

(56) References Cited

U.S. PATENT DOCUMENTS 5,659,520 A * 8/1997 Watson et al. .............. 367/125

FOREIGN PATENT DOCUMENTS

EP            802509 A2 * 10/1997 ........... G07B/15/00

* cited by examiner

*Primary Examiner*—Yonel Beaulieu
(74) *Attorney, Agent, or Firm*—The Kline Law Firm

(57) ABSTRACT

A high-resolution path marking system utilized with inertial navigation systems for land vehicles. The system uses radio frequency tags or "beacons" to mark a route to be traversed by manned or unmanned follower vehicles. The RF tags serve as references to correct time and distance traveled dependent errors that accumulate in the follower vehicle's inertial navigation system. The position of each tag is accurately encoded into its memory using a manned path marking vehicle that "proofs" the route in advance of the follower vehicles. Since the inertial navigation system for the path marking vehicle and for the follower vehicles are synchronized at the start of the route, any errors accumulated in the followers' INS with respect to the path marking vehicle are eliminated at the prescribed intervals where the RF tags are placed. The path marking vehicle can lay the route days, weeks, or even months in advance of use by the follower vehicles. Once the path is marked, it can be reused many times by the follower vehicles without further human intervention. Further, the short-range, ground based RF tags used in this method are less susceptible to jamming, and the tags are covert, i.e. the tags are small and transmit only when interrogated by a secure query signal.

7 Claims, 2 Drawing Sheets

PATH FOLLOWING USING BOUNDED BEACON-AIDED INERTIAL NAVIGATION

BACKGROUND OF THE INVENTION

1. Field of the Invention

The present invention relates generally to navigation systems for unmanned vehicles, and more particularly is a high-resolution system that typically will be utilized in inertial navigation systems (INS) for land vehicles. The system of the present invention uses radio frequency (RF) tags or "beacons" placed by a manned path marking vehicle to define a route that is to be traversed by manned or unmanned follower vehicles.

2. Description of the Prior Art

Military operations often include a mission requirement of resupplying forward units using both manned and unmanned ground vehicles. However, there currently does not exist an acceptable high-speed, precision robotic path following solution for on-road and off-road operations.

Current robotic vehicle solutions that rely on autonomous mobility sensors and software are limited by the speed at which the sensors and software can detect and interpret terrain features and landmarks. Moreover, this approach does not work in complex environmental conditions, i.e., poor lighting conditions, haze, smoke, rain, etc. Further, although high-accuracy INS is readily available for ground vehicles, the INS error increases without bound as a function of distance traveled. Attempting to correct the INS error using a GPS reference is only accurate to ±10 m, which is inadequate for land navigation of a robotic vehicle.

Current art systems utilizing differential or relative GPS systems offer accuracies of ±0.2 m to ±1 m, and carrier phase GPS can provide position accurate to ±2 cm; however, both these types of systems are vulnerable to jamming. Moreover, these systems require line-of-sight RF communications between the differential or relative station and the navigating vehicle. Further, neither differential nor relative GPS navigation-based solutions can satisfy scenarios involving large separations in time and distance between the leader and follower vehicles. The current art approaches require the leader vehicle to be on the path when followers are performing their missions, which is an unnecessary risk to the human crew and adds cost to the operation.

Accordingly, it is an object of the present invention to provide a path following system that does not require the path marking vehicle to be close in time or space to the follower vehicles.

It is a further object of the present invention to provide a path following system that utilizes marking beacons with signals that are not easily jammed.

It is a still further object of the present invention to provide a path following system that functions well in poor visibility conditions.

It is a still further object of the present invention to provide a path following system that provides high speed position determination with a high degree of accuracy.

SUMMARY OF THE INVENTION

The present invention is a high-resolution path marking system utilized with inertial navigation systems for land vehicles. The system of the present invention uses radio frequency tags or "beacons" to mark a route to be traversed by manned or unmanned follower vehicles. The RF tags serve as references to correct time and distance traveled dependent errors that accumulate in the follower vehicle's inertial navigation system. The position of each tag is accurately encoded into its memory using a manned path marking vehicle that "proofs" the route in advance of the follower vehicles. Since the inertial navigation system for the path marking vehicle and for the follower vehicles are synchronized at the start of the route, any errors accumulated in the followers' INS with respect to the path marking vehicle are eliminated at the prescribed intervals where the RF tags are placed.

The RF tag solution embodied by the present invention offers a superior, low-cost approach to the problem of path marking for manned and unmanned follower vehicles. In the approach herein, the manned path marking vehicle can lay the route days, weeks, or even months in advance. Once the path is marked, it can be reused many times by the follower vehicles without further human intervention. Further, the short-range, ground based RF tags used in this method are less susceptible to jamming, and the tags are covert, i.e. the tags are small and transmit only when interrogated by a secure query signal.

Some of the advantages of the system of the present invention relative to the prior art are as follows:

1. Low complexity
   Operates without the need of a Global Positioning Satellite (GPS) signal
   Does not require expensive machine vision sensors to detect obstacles
2. Low cost (RF tags cost only a few dollars each)
3. Secure (RF tags radiate only after being interrogated by a coded query signal)
4. Covert
   RF tags are very small and can be easily disguised to match terrain features, e.g., small stones, twigs, brush, leaves
   Vehicle to vehicle communications are not required to navigate a path
5. Reusable (once laid, the path can be used many times by the followers without further human intervention)
6. Low susceptibility to jamming (the tags are short-range and use ground-based RF)
7. Works in complex and cluttered terrain environments These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
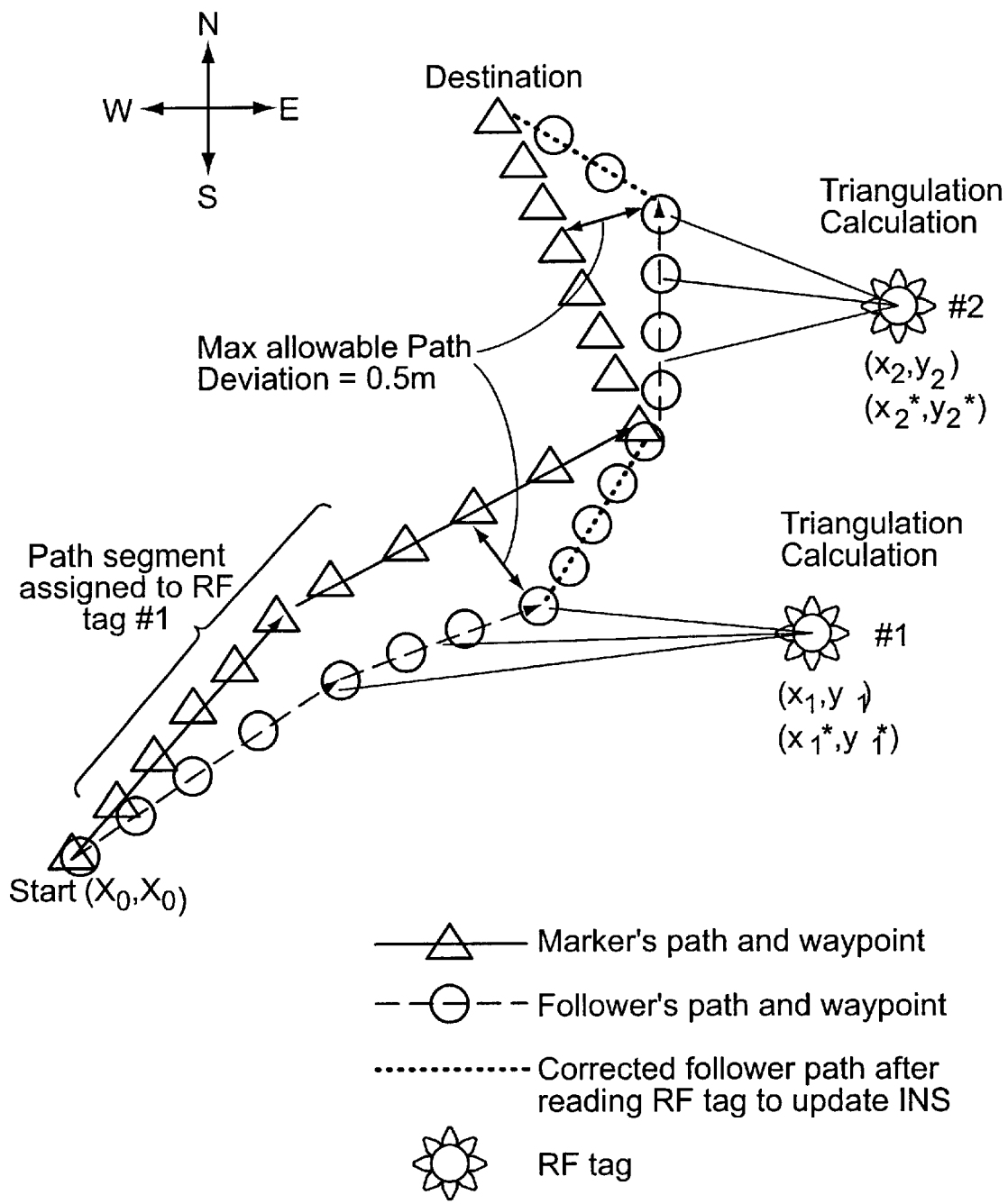
FIG. 1 is a schematic representation of the path marking and following system of the present invention.
Figure 2:
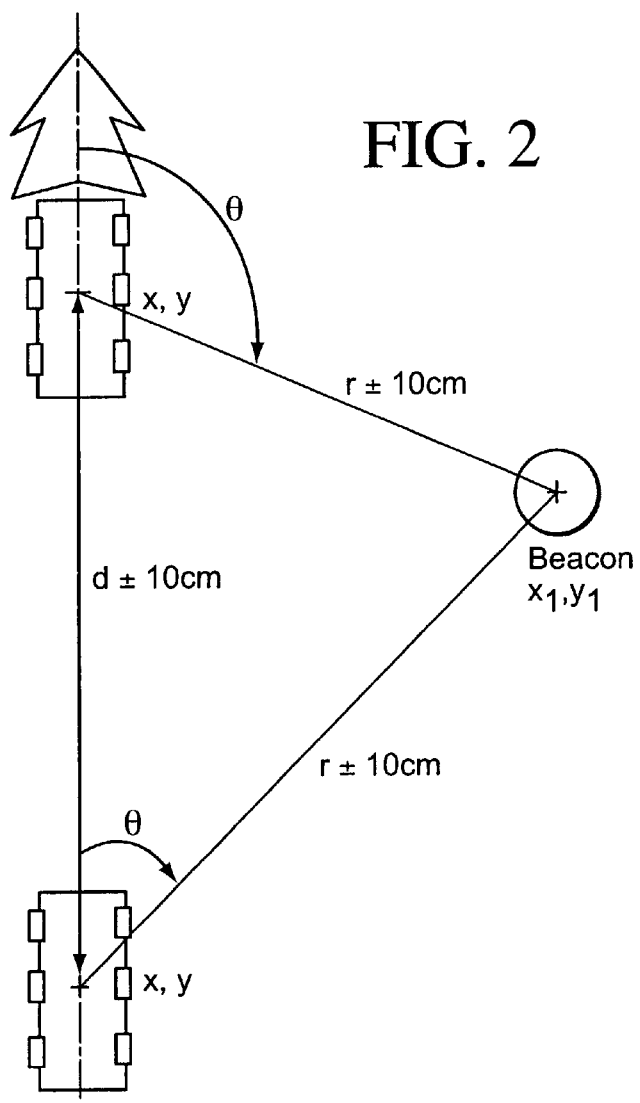
FIG. 2 shows how the triangulation calculation occurs as the vehicle moves along the marked path.
Figure 3:
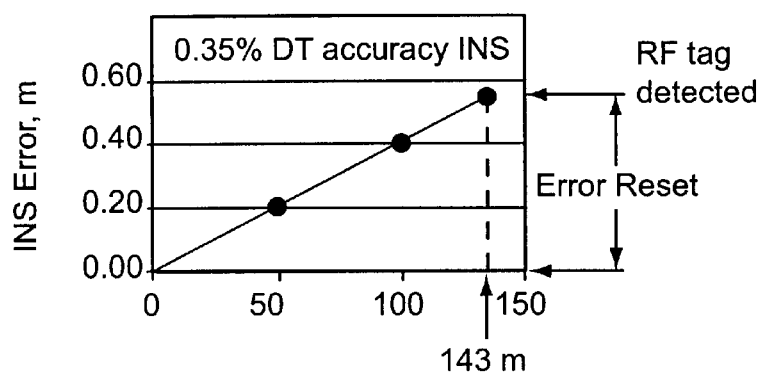
FIG. 3 is a graph showing error versus distance traveled.

The present invention is a method of path following using bounded beacon-aided inertial navigation. The system of the present invention utilizes a manned path marking vehicle to mark the route with a plurality of electronic beacons. In the preferred embodiment, an RF tag with an integrated antenna is used as the electronic beacon means. A transceiver is used in conjunction with the RF tags to communicate identifying information. While it is envisioned that the path will be marked using a manned vehicle, it should be recognized that the path could just as easily be marked by a person on foot or using any other means of transportation.

The RF tags, which typically operate at 2.45-GHz, include an updatable read/write memory. A user, an operator of the path marking vehicle, encodes position information on the RF tags. The RF tags are semi-passive, acting as a virtual reflector by generating an RF transmission only when illuminated by a secure query signal. The read/write range of the RF tags used in the preferred embodiment is 100 m using continuous-wave backscatter calculation. Each RF tag contains 16 K bits of memory (expandable) in the form of flash and/or EEPROM, and can communicate at 25 kbps. The tag transceiver can determine the range to the tag to within ±10 cm.

Each RF tag with its integrated antenna is quite small (1 cm×2.5 cm), and can be embodied in any one of several packaging geometries, e.g., flat plate, cylindrical, or spherical. The RF tags are also durable. For example, RF tags encapsulated inside a protective thermal polyurethane-polycarbonate plastic alloy casing are commercially available, and the assembled tag can withstand a 1,000 g, 0.7 ms, half-sine-wave peak shock load. Finally, configured with a small hearing aid size battery, the useful operating life of the RF tag is approximately five years.

The RF tags are used to implement the system of the present invention as follows:

Preliminarily, the INS systems of the path marking vehicle and the follower vehicles must be synchronized. Then, as the path marking vehicle proceeds along the desired path, an operator drops the electronic beacons, the RF tags, at appropriate locations. The path can be marked well in advance (days or even weeks) of the time that the follower vehicles need to use the route. This of course means that it is not necessary for personnel to be present when robotic follower vehicles are using the marked path.

High relative accuracy, on the order of ±0.5 m for the present example, between the path marking vehicle and the follower vehicles is critical to ensure that the followers do not deviate significantly from the prescribed path. This is especially true when the path is along a narrow road or cuts through terrain cluttered with obstacles. However, absolute global localization is unnecessary. This requirement is eliminated due to the fact that the present system employs the RF tags and the vehicles' inertial navigation systems to describe the route in terms of waypoints, heading to the next waypoint, and speed. This technique is termed bounded beacon-aided navigation. Whenever the path marking vehicle generates a worst case estimate of the followers' INS error that is greater than the 0.5 m preset error threshold, the operator of the path marking vehicle places one of the RF tags.

After depositing an RF tag, the leader uses its INS and the tag transceiver to triangulate a coordinate location ($x_1$, $y_1$ in FIG. 1) for the tag with respect to the location of the path marking vehicle. The path marking vehicle encodes the calculated coordinates into the tag. When a follower vehicle detects a tag, the follower vehicle also computes a coordinate location for the tag ($x_1^*$, $y_1^*$ in FIG. 1), and the error of this calculation is no greater than ±10 cm. Using calculus of variations to analyze the triangulation error equations, it has been determined by the inventor that if the distance between measurements is less than 50 m and is comparable to the distance from the vehicles to the subject tag, and if the distance to the tag is more than 3 m, and if the bearing angles are greater than 45°, then vehicle position accuracy can be determined to the same order of magnitude as the range measurement (±10 cm).

The path marking vehicle continues along the desired route, depositing an RF tag at each point at which the worst case estimate of the error exceeds the chosen threshold. This process of course continues until the path marker has completed marking the entire designated route.

As each follower vehicle traverses the marked path, comparison of the follower's calculated coordinates to those encoded in each RF tag by the path marker enable the follower to synchronize its position estimate relative to the position defined by the information stored in the RF tag. Once the follower synchronizes its position estimate, the follower vehicle can steer itself to more closely follow the path traveled by the leader. One very significant benefit of this approach is that the leader's and follower's absolute INS error do not affect how accurately the follower will adhere to the prescribed route, i.e., the vehicles' absolute INS error can be infinite without any effect on path following. Hence, effective robotic following reduces to ensuring that the relative error between the leader INS and follower INS does not exceed the error threshold defined for a given path. The follower may not know with any certainty his true global position, but the follower can always determine how far, if at all, his path varies from that defined by the RF tags marking the desired path. Again, this presupposes that the INS systems of the path marking and follower vehicles are synchronized prior to the placement of the RF tags defining the path. Note that by operation of the system, the follower's INS will have been synchronized with the leader's INS once the first tag has been read and triangulated.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A bounded beacon-aided inertial navigation method comprising the steps of:
    a) synchronizing a navigation system of a path marker with a navigation system of at least one follower vehicle;
    b) marking a path with a plurality of electronic beacons that communicate with a transceiver of said path marker;
    c) calculating location coordinates for each said electronic beacon relative to said navigation system of said path marker;
    d) encoding into each said electronic beacon corresponding calculated location coordinates;
    e) activating sequentially said electronic beacons with a signal from said at least one follower vehicle;
    f) calculating location coordinates for a detected electronic beacon relative to said at least one follower vehicle; and
    g) steering said at least one follower vehicle based on said calculated location coordinates.

2. The method of claim 1 wherein:
    said electronic beacons are tags that emit a radio frequency signal.

3. The method of claim 1 wherein:
    said path marker is a manned vehicle.

4. The method of claim 1 wherein:
    said follower vehicles are unmanned.

5. The method of claim 1 wherein:

said follower vehicles are manned.

6. The method of claim 1 wherein:

said signal from said follower vehicle is a secure signal so that said electronic beacons can be activated only by authorized users.

7. The method of claim 1 wherein:

said transceiver can determine a distance between said transceiver and said electronic beacon within a range of ±10 cm.

* * * * *